United States Patent [19]
Takahashi

[11] Patent Number: 5,761,176
[45] Date of Patent: Jun. 2, 1998

[54] OPTICAL HEAD DEVICE WITH OPTICALLY VARIABLE APERTURE FOR DISKS WITH DIFFERENT THICKNESSES

[75] Inventor: Jun-ichi Takahashi, Tokyo, Japan

[73] Assignee: NEC Corporation, Japan

[21] Appl. No.: 710,847

[22] Filed: Sep. 23, 1996

[30] Foreign Application Priority Data

Sep. 29, 1995 [JP] Japan ................. 7-252889

[51] Int. Cl.⁶ ............................................. G11B 7/00
[52] U.S. Cl. ................. 369/109; 369/94; 369/44.23; 369/112; 369/118
[58] Field of Search ........................... 369/112, 109, 369/117, 118, 120, 116, 94, 44.23

[56] References Cited

U.S. PATENT DOCUMENTS

| | | | |
|---|---|---|---|
| 5,058,091 | 10/1991 | Murao et al. | 369/112 |
| 5,281,797 | 1/1994 | Tatsuno et al. | 369/117 |

FOREIGN PATENT DOCUMENTS

| | | |
|---|---|---|
| 0470807 | 2/1992 | European Pat. Off. . |
| 0620550 | 10/1994 | European Pat. Off. . |
| 0731457 | 9/1996 | European Pat. Off. . |
| 0745977 | 12/1996 | European Pat. Off. . |
| 4-219627 | 8/1992 | Japan .................. G11B 7/08 |
| 5120720 | 5/1993 | Japan . |
| 5205282 | 8/1993 | Japan . |
| 6020298 | 1/1994 | Japan . |
| 6259804 | 9/1994 | Japan . |
| 8045105 | 2/1996 | Japan . |

Primary Examiner—David C. Nelms
Assistant Examiner—Kim-Kwok Chu
Attorney, Agent, or Firm—Hayes, Soloway, Hennessey, Grossman & Hage, P.L.C.

[57] ABSTRACT

The optical head device includes a laser light source, a beam splitter for reflecting light emitted from the laser light source, a converging lens for converging light reflected from the beam splitter as a minute beam spot on a recording surface of an optical disk medium, a photo-detector for receiving modulated reflected light from the recording surface of the optical disk medium through the converging lens and the beam splitter, and a diffraction grating disposed between the laser light source and the beam splitter. The device is featured by the provision of a variable aperture element which is disposed between the converging lens and the beam splitter and which is capable of controlling the transmission and blocking of the light depending on the polarization directions. The arrangement enables the reproduction of the data recorded in optical disk media having different thicknesses by a single objective lens.

12 Claims, 6 Drawing Sheets

OPTICAL HEAD DEVICE WITH OPTICALLY VARIABLE APERTURE FOR DISKS WITH DIFFERENT THICKNESSES

BACKGROUND OF THE INVENTION (1) Field of the Invention

The present invention relates to an optical head device, and more particularly to an optical head device for use in an optical medium recording and reproduction device.

(2) Description of the Related Art

A conventional optical head device of the kind to which present invention relates is shown in FIG. 1. Such a device includes, as disclosed, for example, in U.S. patent application Ser. No. 777,019 filed on Oct. 16, 1991, a semiconductor laser 51 as the light source, a diffraction grating 52, a beam splitter 53, an objective lens 54 and a photo-detector 55. It is designed to provide a minute beam spot on a recording medium (optical disk medium) 100 and to make the reflected light a reproduction signal of data.

The light emitted from the semiconductor laser 51 is formed into three beams for detecting tracking error signals when transmitted through the diffraction grating 52, and the three beams are converged on the objective lens 54 after being reflected from the beam splitter 53. The reflected light from the signal surface of the recording medium 100 is incident on the light receiving surface of the photo-detector 55 through the objective lens 54 and the beam splitter 53, which is then converted to electrical signals.

During the focusing error signal detection for controlling the minute beam spot by following a "surface position instability" of the recording medium 100, when the light which is reflected from the recording medium 100 is again incident on the objective lens 54 and passes through the beam splitter 53, the astigmatism is generated and the light is incident on the photo-detector 55, thus detecting the focusing error signal. This is a conventionally known astigmatism method.

During the tracking error signal detection for following the eccentricity of the recording medium 100, the three beams formed by the diffraction grating 52 mentioned above are irradiated on the recording medium 100 and, by setting the rotating position of the diffraction grating 52 such that ±1-order beams are positioned respectively at the two sides of the tracking pit, the tracking error detection is carried out by taking the difference between ±1-order beams.

In the optical data reproduction device as above, an increase in the data capacity is desired so that, in a device such as above, the easiest method for the realization of high density data capacity is to reduce the size of a beam spot irradiated on the recording medium 100.

The size of the minute beam spot on the recording medium 100 largely dependents on the laser wave length $\lambda$ and the magnitude of the NA of the objective lens. Therefore, the way to reduce the size of the irradiated spot, which is employed nowadays, is to use a design such that the laser wave length $\lambda$ is made short or the NA is made large.

However, although it is possible for the optical head to be designed with a short laser wave length or a large NA, when the reproduction is made of a recording medium having conventional recording density and if there is a thickness difference in the medium, the optical head suffers from a large influence of spherical aberration, thus making it impossible to form a desired minute beam spot on the surface of the medium.

FIGS. 2A and 2B show the relationship between the conventional objective lens 54 and thicknesses of the recording media. With the conventional objective lens 54, as shown in FIG. 2A, aberration compensation of the objective lens 54 is made in correspondence to the thickness of the optical disk medium 100, so that it is possible to converge the received beam to the diffraction limit on the recording surface of the optical disk medium 100.

On the other hand, when the light which passes through the objective lens 54 that is designed and formed in the state as shown in FIG. 2A, is incident on the recording medium 101 having a different thickness (thicker), the converged beam deviates from the optimally designed value of the objective lens for the reason that, as shown in FIG. 2B, the distance which the converged and refracted beam is transmitted through the recording medium 101 becomes longer.

Therefore, even if the optical disk medium 100 was one having a high density data capacity and the optical disk medium 101 was one having a conventional density data capacity, the reproduction of data from the optical disk medium 101 requires that the spot diameter be made smaller than a predetermined NA as, otherwise, the reproduction would not be satisfactory.

In an attempt to overcome the above problem, there has been proposed a method which enables the reproduction of data from recording media having different thicknesses.

For example, Japanese Patent Application Kokai Publication No. Hei 4-219627 proposes the provision of a mechanism for attaching/detaching of a parallel plate to the light emission surface of a diaphragm lens, and Japanese Patent Application Kokai Publication No. Hei 5-205282 proposes the provision of cover plates to optical disks.

However, in a reproduction system for recording media having different thicknesses as described above, it is necessitated to provide special mechanisms and, as a result, the size of the overall device becomes large resulting in an increase in costs.

That is, the first problem in the conventional examples explained above is that, in the optical head for making the reproduction of high density data, it is not possible to make data production from media having different thicknesses.

The reason for the above is that, according to the conventional technique, the objective lens of the optical head device with which the laser spot diameter is reduced is designed with reference to the thicknesses of disks and the refractive indexes so that the aberration is optimally compensated in the designing step. Therefore, in a high density data recording medium, since the design itself is optimized, there may be no problem in the designed reproduction. However, in the case where a minute beam spot is irradiated on a surface of the medium having thicknesses with the values thereof deviating from the designed values, there is a large influence due to the spherical aberration so that a spot diameter with a smaller NA than the desired NA is irradiated, and this makes it impossible to carry out the reproduction.

A second problem is that, as a means to overcome the problems existing in the prior art, although attempts have been made to increase the spot diameter by making the NA of the objective lens smaller through the control of the aperture of the objective lens, none of such aperture control methods have been of any practical use.

The reason for the above is that, in an optical disk reproduction device, in order to irradiate a minute beam spot on data recorded on the recording medium, it is necessary for the spot to follow the "surface position instability" and the "eccentricity" of the recording medium and, for this purpose, it requires the supporting mechanism to move in two axes, one to follow the direction of the surface position instability and the other to follow the direction of the eccentricity. Thus, if the aperture to be controlled is provided on the objective lens, the weight is added to the movable portion thus adversely affecting the capability to follow the surface position instability and the eccentricity. If this capability to follow is to be ensured, an increase in the size of the driving mechanism has been inevitable.

SUMMARY OF THE INVENTION

An object of the present invention, therefore, is to overcome the problems existing in the prior art, and to provide an optical head device which, when reproducing predetermined data from an optical disk medium having high density data by irradiating a laser spot on the optical disk medium, enables the reproduction of data by one optical head device from optical disk media having different thicknesses.

According to one aspect of the invention, there is provided an optical head device comprising:

a laser light source means;

a beam splitter means for reflecting light emitted from the laser light source means;

a converging lens for converging light reflected from the beam splitter means as a minute beam spot on a recording surface of an optical disk medium;

a photo-detector for receiving, through the converging lens and the beam splitter means, modulated reflected light from the recording surface of the optical disk medium;

a diffraction grating means disposed between the laser light source means and the beam splitter means; and a variable aperture means disposed in a light path between the converging lens and the laser light source, the variable aperture means being capable of controlling a diameter of the light reflected from the beam splitter means.

The optical head device may be such that the laser light source means is constituted by a semiconductor laser, the beam splitter means is constituted by a beam splitter, the diffraction grating means is constituted by a diffraction grating, and the variable aperture means is constituted by a variable aperture element disposed between the converging lens and the beam splitter, the variable aperture element being capable of controlling transmission and blocking of the light depending on polarization directions thereof.

Also, the optical head device may be one which further comprises a first collimating lens and a second collimating lens and in which the laser light source means is constituted by a first laser light source and a second laser light source;

the diffraction grating means is constituted by a first diffraction grating and a second diffraction grating;

the beam splitter means is constituted by a first beam splitter and a second beam splitter, the first beam splitter being for receiving, through the first collimating lens and the first diffraction grating, the light reflected from the first laser light source; and the variable aperture means includes the second collimating lens, the second laser light source for sending a predetermined laser light to the second beam splitter provided between the first beam splitter and the photodetector, the second diffraction grating provided between the second laser light source and the second beam splitter, and the second collimating lens being set such that a width of a parallel light flux outputted therefrom is narrower than a width of a parallel light flux outputted from the first collimating lens.

The arrangement according to the invention enables the reproduction of the data recorded in a plurality of optical disk media having different thicknesses by a single objective lens without requiring a change of the lens. Since the single objective lens can satisfy the needs for carrying out the reproduction without requiring a plurality of objective lens or a plurality of optical heads in correspondence to the thicknesses of the media, it is possible to provide an optical head device which is low cost and is compatible with the conventional disk, and which permits more general or flexible use as compared with the conventional optical head devices.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1:
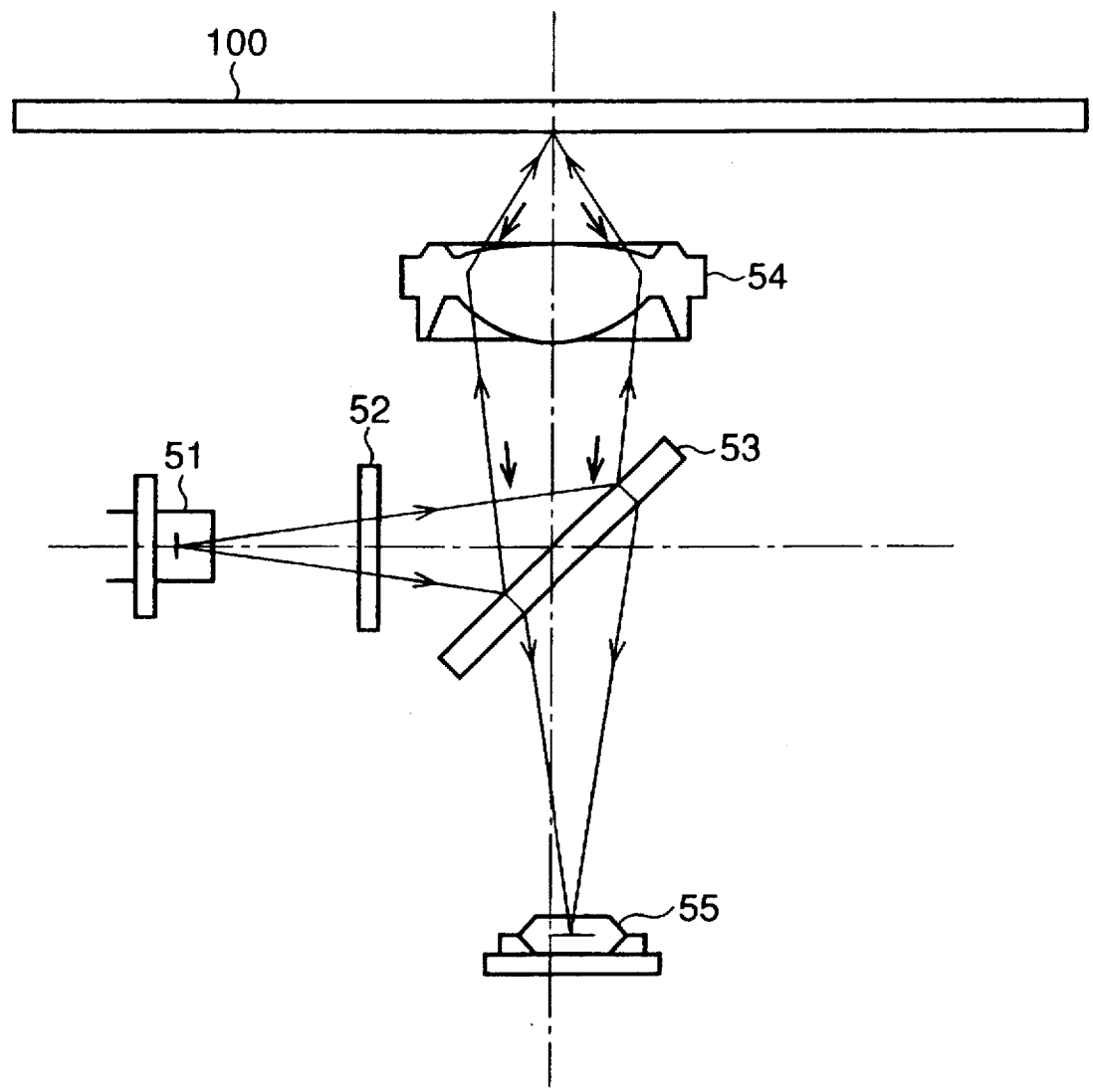
FIG. 1 is a structural diagram of a conventional optical head device.
Figure 2A:
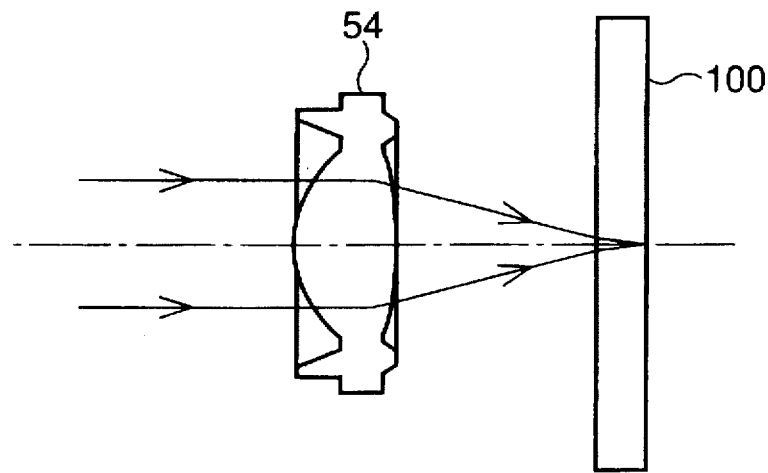
FIGS. 2A and 2B are diagrams for use in explaining the relationship between the conventional objective lens and thicknesses of the recording media, FIG. 2A showing the recording medium as having a normal thickness and FIG. 2B showing the recording medium as being a high density recording medium and as being thicker.
Figure 2B:
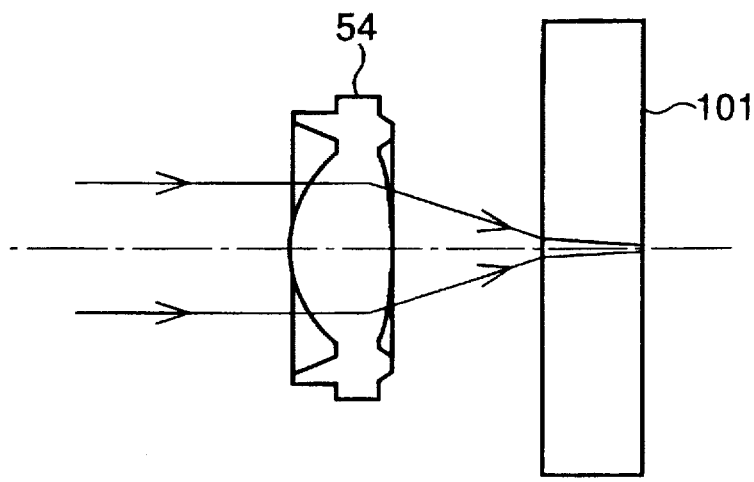
Figure 3:
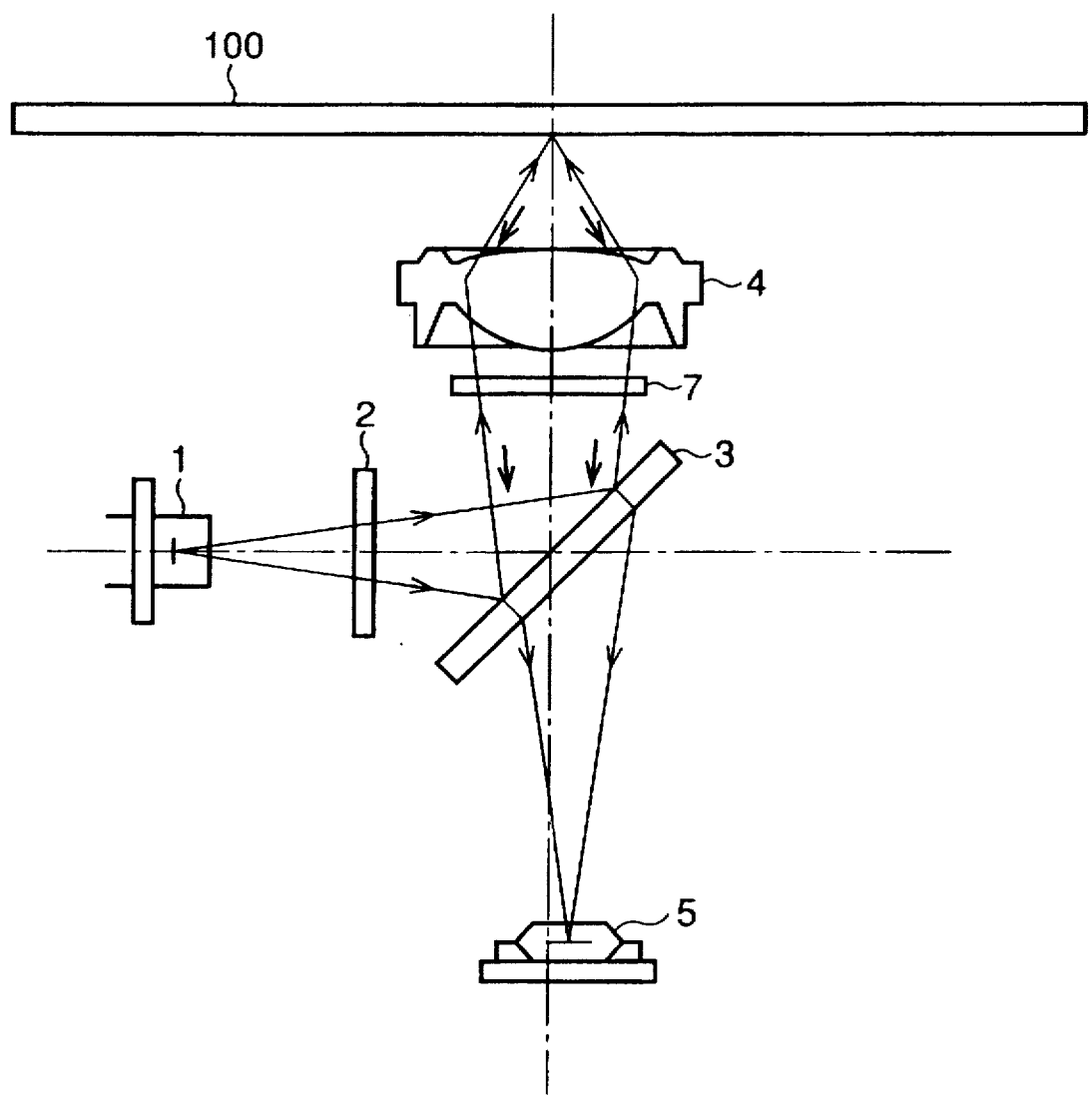
FIG. 3 is a structural diagram of an optical head device of a first embodiment according to the invention.
Figure 4:
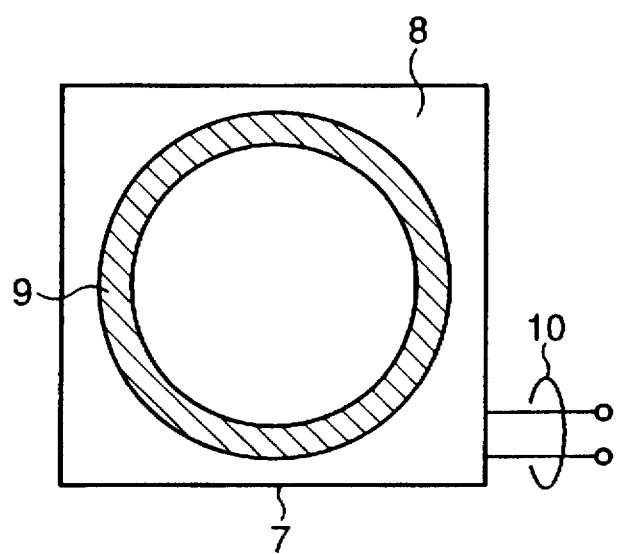
FIG. 4 is a plan view of an example of a variable aperture element included in the device shown in FIG. 3.

FIGS. 3 to 5 show an optical head device of a first embodiment according to the invention. Numeral 1 depicts a semiconductor laser as a laser light source, numeral 3 depicts a beam splitter which reflects the light emitted from the semiconductor laser 1, and numeral 4 depicts a converging lens (objective lens) which converges the reflected light from the beam splitter as a minute beam spot on a recording surface of an optical disk medium 100. Also, numeral 5 depicts a photo-detector which receives the modulated reflected light from the recording surface of the optical disk medium 100 through the converging lens 4 and the beam splitter 3. Further, there is a diffraction grating 2 between the semiconductor laser 1 and the beam splitter 3.

Between the converging lens 4 and the beam splitter 3, there is provided a variable aperture element 7 which is, as explained later, formed by an acousto-optic element as a base.

In the optical system of the optical head device shown in FIG. 3, the light emitted from the semiconductor laser 1 is transmitted through the diffraction grating 2, thus being formed into three beams for detecting tracking errors. The direction of these beams is changed towards the objective lens 4 by the beam splitter 3. The light reflected by the beam splitter 3 passes through the variable aperture element 7 before entering into the objective lens 4.

The variable aperture element 7 is set so as to allow the light at the aperture of the objective lens 4 to be transmitted. The laser light having passed through the variable aperture element 7 and the objective lens 4 is converged to a minute light spot whose diameter is smaller than the numerical aperture of the objective lens 4. The minute light spot is incident on the data recording surface of the optical disk medium 100.

The reflected light from the data recording surface of the optical disk medium 100 is again incident on the objective lens 9 and on the beam splitter 3 after passing through the variable aperture element 7. As shown in FIG. 3, the light incident on the beam splitter 3 is transmitted therethrough while being refracted in accordance with Snell laws of refraction.

Of the light transmitted through the beam splitter 3, the light that is parallel to the plane of the drawings is expanded while the light that is vertical to the plane of the drawings passes through as it is (which is the function of the beam splitter 3) so that there occurs astigmatism.

By this astigmatism, a focusing error detection signal is detected.

Next, the light having passed through the beam splitter 3 is converged at the photo-detector 5. Thus, the photo-detector 5 detects a reproduction signal, a focus error signal and a tracking error signal.

FIG. 4 is a structural diagram of the variable aperture element 7. On an ordinary glass plate or a crystal optical element 8, there is formed a ring 9 whose aperture diameter is matched to that of the objective lens 54 by an optical element that is capable of controlling the transmission and blocking of the light depending on the polarization directions.

An example of the optical element capable of controlling transmission and blocking of the light is an acousto-optic element. By causing the current to flow from the electrode 10 to the ring 9 formed by the acousto-optic element, it is possible to increase or decrease the extent to which the transmission is permitted depending on the polarization directions, thus making it possible to vary the aperture.

Figure 5A:
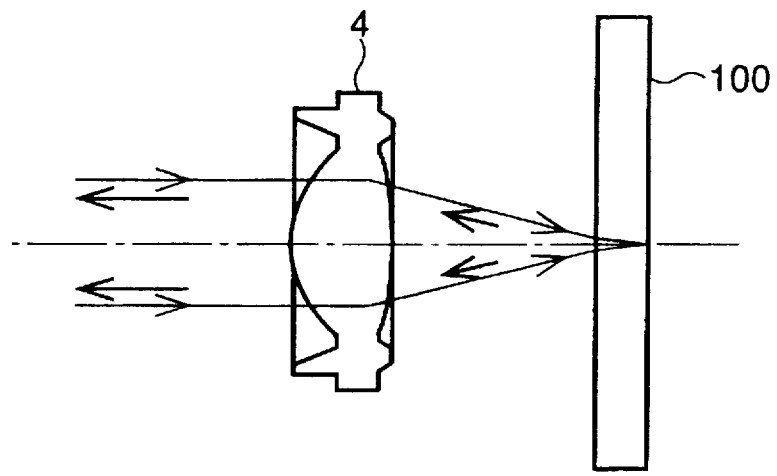
FIGS. 5A and 5B are diagrams for use in explaining the relationship between the converging lens (objective lens) and thicknesses of the recording media in the device according to the invention, FIG. 5A showing the recording medium as having a normal thickness and FIG. 5B showing the recording medium as being a high density recording medium and as being thicker.
Figure 5B:
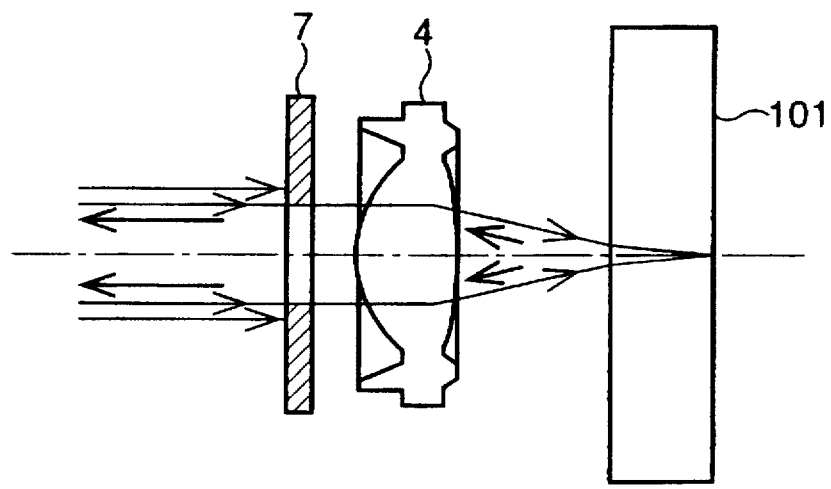

Here, as shown in FIG. 5A, the objective lens 4 that is designed and formed to have thicknesses corresponding to the conventional medium is capable of irradiating a minute beam spot on the recording surface of the optical disk medium 100. However, as shown in FIG. 5B, in the optical disk medium 101 which has a different thickness, the aperture is controlled such that the minute beam spot is formed on the optical disk medium 101 with the aperture ratio being smaller than the NA of the actual objective lens 4.

That is, since the aperture ratio is reduced to smaller than the NA of the actual objective lens 4, the spot diameter formed on the optical disk medium itself becomes large but, on the other hand, the spherical aberration becomes small, thus enabling the reproduction of the optical disk medium 100 having data density as in the conventional example.

In the device shown in FIG. 3, when use is made of the objective lens formed with its thickness being matched to a high density medium and the reproduction is made of an optical disk media having different thicknesses with the data densities being as in the conventional example, although the converged spot is enlarged by the control of the aperture, the diameter of the spot is sufficient to reproduce the media with data densities as in the conventional example. Also, as to the amount of aberration, as compared with that generated when the aperture control is not made and the optical disk media having different thicknesses are reproduced, the aberration suppression can be made correspondingly to the enlarged portion of the converged spot diameter.

For the above reason, in the embodiment as shown in FIG. 3, it is possible to reproduce the data recorded on optical disk media having different thicknesses using one objective lens, that is, without the need of providing a plurality of objective lenses or a plurality of overall devices, thus enabling the provision of an optical head device which is low cost and is compatible with the conventional disks.

Now, an optical head device of a second embodiment according to the invention is explained with reference to FIG. 6.

The optical head device of the second embodiment is featured in that it is provided with a single converging lens (objective lens) 4, a photo-detector 5, two kinds of laser light sources which correspond to thicknesses of the optical disk medium, collimating lens respectively corresponding to the two kinds of laser light sources, and diffraction gratings respectively corresponding to the two kinds of laser light sources.

Figure 6:
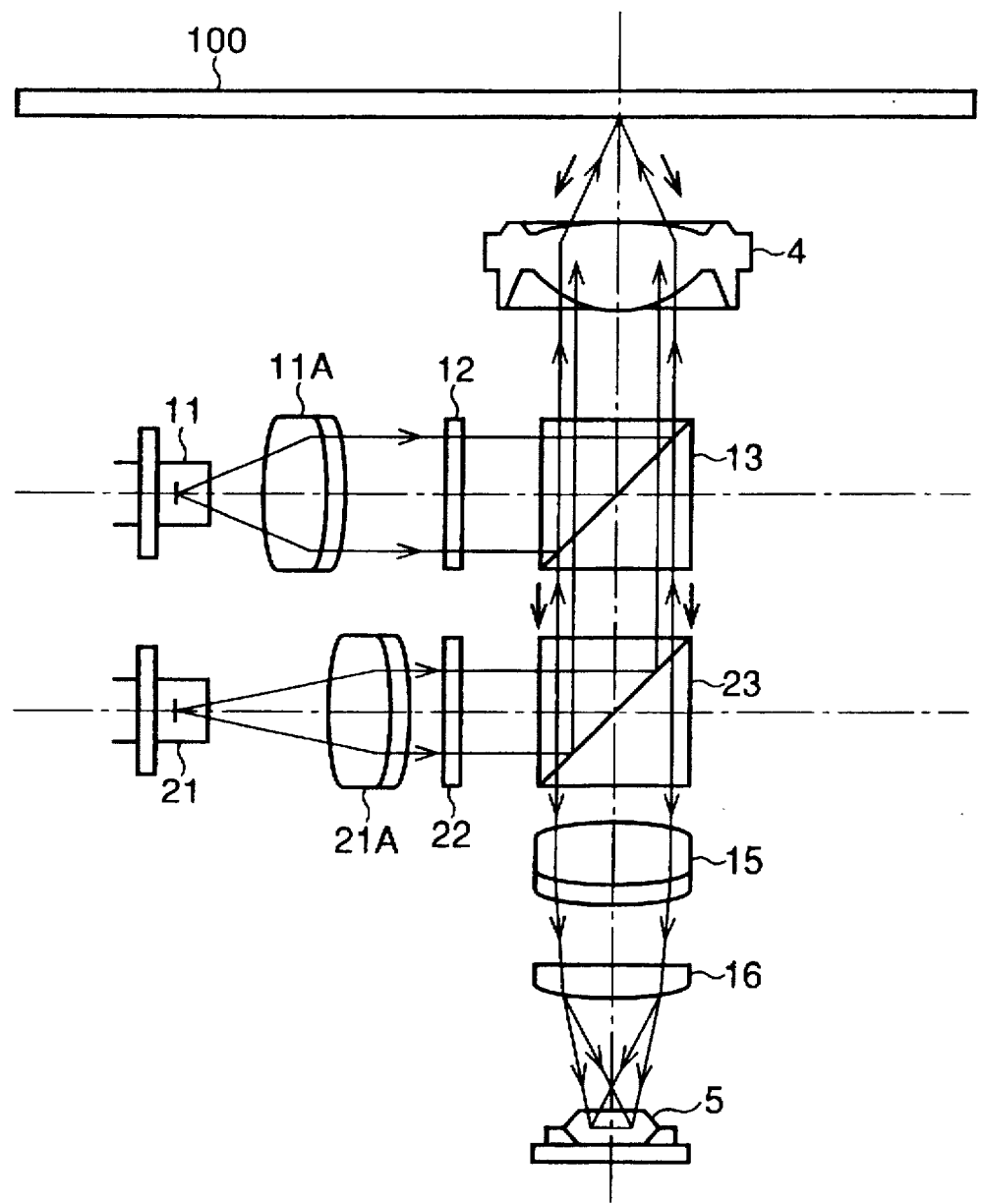
FIG. 6 is a structural diagram of an optical head device of a second embodiment according to the invention.

As shown in FIG. 6, the optical system of the optical head device of the second embodiment includes the first laser light source 11 (additional laser light source), the first beam splitter 13 (additional beam splitter) which receives and reflects the reflected light from the first laser light source 11 through the first collimating lens 11A and the first diffraction grating 12 (additional diffraction grating), the converging lens 4 which converges the reflected light from the first beam splitter 13 as a minute beam spot on a recording surface of the optical disk 100, and the photo-detector 5 which receives the modulated reflected light from the recording surface of the optical disk medium 100 through the converging lens 4 and the first beam splitter 13.

The optical head device includes the second beam splitter 23 provided between the first beam splitter 13 and the photo-detector 5, and the second semiconductor laser 21 as a second laser light source which sends a predetermined laser light to the second beam splitter 23. In FIG. 6, there are provided a convex lens 15 and a cylindrical lens 16 between the second beam splitter 23 and the photodetector 5.

Between the second semiconductor laser 21 and the second beam splitter 23, there are provided a second collimating lens 21A and a second diffraction grating 22. The parallel light flux outputted from the second collimating lens 21A is set such that the width thereof is narrower than that of the parallel light flux outputted from the first collimating lens 11A (additional collimating lens).

As a means to set the width of the parallel light flux outputted from the second collimating lens 21A narrower than that of the parallel light flux outputted from the first collimating lens 11A, the second collimating lens 21A provided is formed to be the same as the first collimating lens 11A and the second laser light source provided is one in which the beam emitting angle thereof is smaller than the beam emitting angle of the first laser light source.

Alternatively, the second semiconductor laser 21 may be formed to be the same as the first semiconductor laser 11 and the second collimating lens 21A may be formed to be the same as the first collimating lens 11A, and an aperture diaphragm element may be provided between the second collimating lens 21A and the second diffraction grating 22.

In the second embodiment, the laser light sources may be appropriately used depending on the thicknesses of the optical disk medium so that, in addition to achieving the same advantageous effects as those in the first embodiment shown in FIG. 3, the second embodiment enables the achievement of a higher precision reproduction signal of data recorded in the optical disk medium.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An optical head device comprising:

a semiconductor laser light source;

a beam splitter for reflecting light emitted from said laser light source;

a converging lens for converging light reflected from said beam splitter as a minute beam spot on a recording surface of an optical disk medium;

a photo-detector for receiving, through said converging lens and said beam splitter, modulated reflected light from said recording surface of said optical disk medium;

a diffraction granting disposed between said semiconductor laser light source and said beam splitter; and a variable aperture element disposed in a light path between said converging lens and said beam splitter, said variable aperture element being capable of controlling transmission and blocking of light reflected from said beam splitter depending on polarization directions thereof.

2. An optical head device according to claim 1, in which said variable aperture element comprises an acousto-optic element.

3. An optical head device comprising:

a first and a semiconductor second laser light source;

a first and a second collimating lens;

a first and a second diffraction grating;

a first beam splitter for receiving, through said first collimating lens and said first diffraction grating, light reflected from said first semiconductor laser light source;

a converging lens for converging light reflected from said first beam splitter as a minute beam spot on a recording surface of an optical disk medium;

a photodetector for receiving, through said converging lens and said first beam splitter, modulated reflected light from said recording surface of said optical disk medium; and, a second beam splitter disposed between said first beam splitter and said photodetector;

said second collimating lens and said second diffraction grating disposed between said second semiconductor laser light source and said second beam splitter, said second collimating lens being set such that a width of a parallel light flux outputted therefrom is narrower than the width of a parallel light flux outputted from said first collimating lens.

4. An optical head device according to claim 3, wherein the first and second semiconductor laser light sources are identical, and the first and second collimating lens are identical, and further comprising an aperture diaphragm element disposed between the second collimating lens and the second diffraction grating.

5. An optical head device according to claim 3, wherein said second collimating lens and said first collimating lens are identical, said second semiconductor laser light source being set such that an emitted beam angle therefrom is smaller than an emitted beam angle from said first laser light source.

6. An optical head device according to claim 3, wherein said second semiconductor laser light source and said first semiconductor laser light source are identical, and said second collimating lens and said first collimating lens are identical, and wherein a variable aperture diaphragm element is disposed between said second collimating lens and said second diffraction grating.

7. An optical head device comprising:

a semiconductor laser light source;

a beam splitter for reflecting light emitted from said semiconductor laser light source;

a converging lens for converging light reflected from said beam splitter as a minute beam spot on a recording surface of an optical disk medium;

a photo-detector for receiving, through said converging lens and said beam splitter, modulated reflected light from said recording surface of said optical disk medium;

a diffraction grating disposed between said semiconductor laser light source and said beam splitter; and a variable optical means disposed in a light path between said converging lens and said beam splitter, said variable optical means being capable of controlling a diameter of the light reflected from said beam splitter.

8. An optical head device according to claim 7, wherein by said variable optical means comprises a variable aperture element disposed between said converging lens and said beam splitter, said variable aperture element being capable of controlling transmission and blocking of the light depending on polarization directions thereof.

9. An optical head device according to claim 8, wherein said variable aperture element comprises an acousto-optic element.

10. An optical head device according to claim 7, and further comprising a collimating lens disposed between said semiconductor laser light source and said diffraction grating, and in which said variable optical means comprises an additional collimating lens, an additional semiconductor laser light source, an additional diffraction grating, and an additional beam splitter, said additional semiconductor laser light source being for sending a predetermined laser light to said additional beam splitter provided between said beam splitter and said converging lens, said additional diffraction grating being provided between said additional collimating lens and said additional beam splitter, said additional beam splitter being for receiving, through said additional collimating lens and said additional diffraction grating, the light reflected from said additional semiconductor laser light source, and said additional collimating lens being set such that a width of a parallel light flux outputted therefrom is narrower than a width of a parallel light flux outputted from said collimating lens.

11. An optical head device according to claim 10, wherein said additional collimating lens and said collimating lens are identical, said additional semiconductor laser light source being set such that an emitted beam angle therefrom is smaller than an emitted beam angle from said semiconductor laser light source.

12. An optical head device according to claim 10, wherein said additional semiconductor laser light source and said semiconductor laser light source are identical, and said additional collimating lens and said collimating lens are identical, and further comprises a variable aperture diaphragm element disposed between said additional collimating lens and said additional diffraction grating.

* * * * *